W. H. BRAMBLE.

Assignor to the Yale Lock Manufacturing Co.

POST OFFICE BOX.

No. 7,624. Reissued April 24, 1877.

WITNESSES

C. Clarence Poole

Wm A. Stinchcomb

INVENTOR

W. H. Bramble,

By his Attorneys

Baldwin, Hopkins & Peyton

N. PETERS, PHOTO-LITHOGRAPHER, WASHINGTON, D. C.

UNITED STATES PATENT OFFICE

WILLIAM H. BRAMBLE, OF DECATUR, ILLINOIS, ASSIGNOR TO THE YALE LOCK MANUFACTURING COMPANY, OF STAMFORD, CONNECTICUT.

IMPROVEMENT IN POST-OFFICE BOXES.

Specification forming part of Letters Patent No. 53,562, dated April 3, 1866; antedated March 30, 1866; reissue No. 7,624, dated April 24, 1877; application filed January 5, 1877.

*To all whom it may concern:*

Be it known that I, WM. H. BRAMBLE, of Decatur, in the county of Macon and State of Illinois, have invented certain new and useful Improvements in Post-Office Boxes; and that the following, taken in connection with the accompanying drawings, is a full, clear, and exact description thereof.

Figure 1:
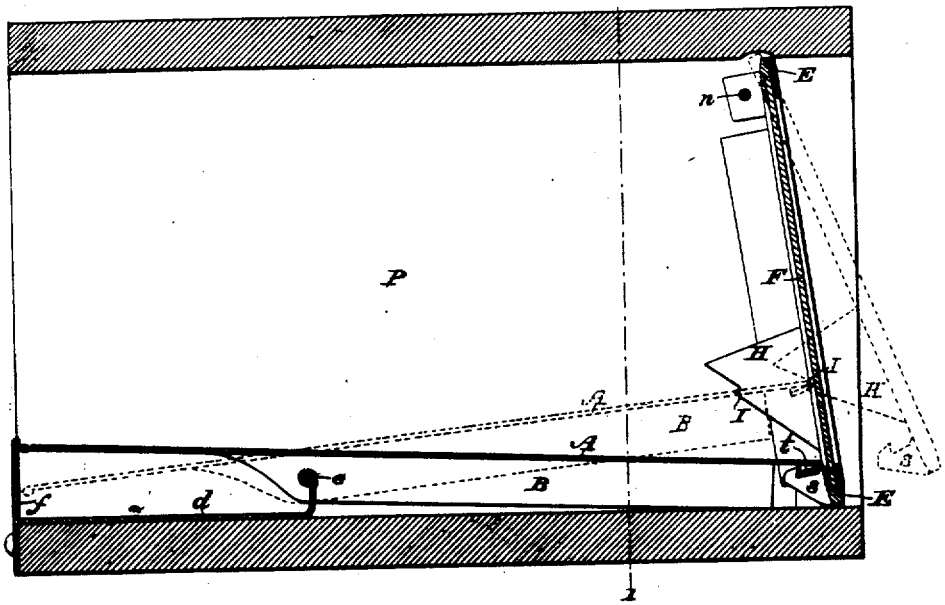
Figure 2:
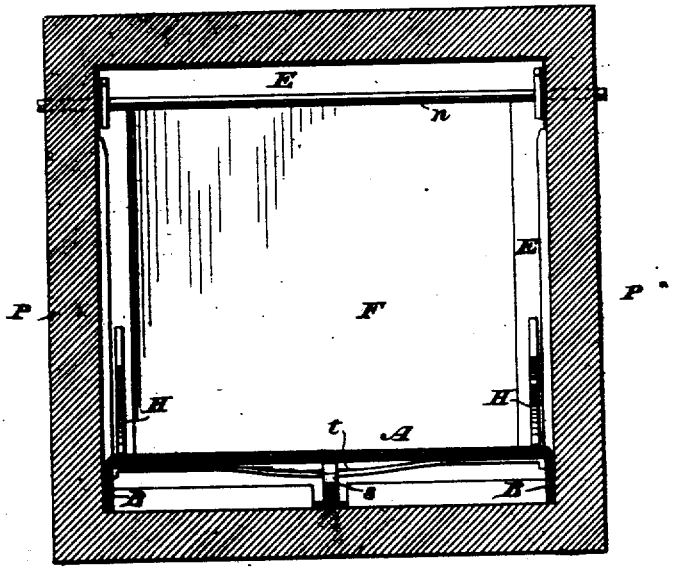

In the drawings, Figure 1 is a vertical longitudinal central section of my post-office box. Fig. 2 is a vertical transverse section on the line 1 1 of Fig. 1, as seen looking toward the door from the inside.

The full lines in Fig. 1 illustrate the door as closed and fastened. The dotted lines show the door and the platform in the position they assume when the postmaster has unfastened and partly opened the door.

Prior to date of my invention, letter-boxes (such as now termed "call-boxes") were in use in post-offices. They consisted of a series of wooden pigeon-holes open at both ends, and having on the side farthest from the interior of the office an ordinary glazed sash located in front of them, but not connected with them. The contrivance consisted, in fact, of several rows of such pigeon-holes located behind a glazed partition. This sash-partition prevented persons calling for letters from reaching the interior of the pigeon-holes, so as to take out the letters, but permitted them to observe whether letters were or were not contained in the pigeon-holes. In practice, the postmaster or his clerks deposited the letters in the pigeon-holes, and when the renter of the box desired to get his letters, he, in some way, notified the post-office attendant, who went to the inside of the box, took out the contents, carried them to a window, and there delivered them to the person waiting, who was obliged to go from the box to the window to receive them.

The great object of my invention is to save the time both of the employés of the post-office and of the receiver of the letters; and to this end I provide each pigeon-hole with a glazed door on the side farthest from the interior of the office, so that the letters may be delivered through this door, thus obviating the necessity of either the post-office clerk or the receiver going to the delivery-window; and I believe that I am the first person who has so constructed a post-office box that letters may be delivered through it—that is, inserted into the box by the postmaster through its open end, and delivered through the doorway at the other end of the box when the door is open.

In the drawings, the sides, top, and bottom of a pigeon-hole are represented at P P. This pigeon-hole is open at the rear, so that letters may be introduced into it by the post-office clerk, and is closed at the front end, when the door is shut, by a sash-door composed of a pane of glass, F, supported in a frame, E. This frame E has attached to it two lugs with holes in them, through which a rod, *n*, passes into the sides of the pigeon-hole, the lugs and rod being, in fact, an ordinary hinge. This sash-door is hinged in such manner at the top that the bottom projects out farther than the top, so that the door will (if desired) close of itself, and, when closed, it prevents access from the outside to the interior of the pigeon-hole. Inside of this box I locate a platform, A, provided with two flanges, B, with holes in them, through which passes a rod, *e*. This rod is attached to a piece of metal, *d*, which, in its turn, is secured to another piece of metal, *f*, that is fastened to the inside of the pigeon-hole by two tacks. The front end, or that nearest the sash-door, of this platform A is bent downward at *t*, so as to form a hook. The platform A, with its hook thus hinged, so that it can be tilted vertically, forms an ordinary latch or fastening contrivance, and the letters to be delivered are to be laid on this platform. Near the bottom of the sash-door I secure a catch, *s*, into which the hook-latch *t* can take when the door is shut, this catch being an ordinary keeper for the latch. Under this construction, when a caller sees letters in his box, he asks for the same by tapping on the sash-door, and the attendant, when he comes, can, by striking downward on the inner end of the platform, open the latch or fastening contrivance, so that the door may be unclosed, and the letters delivered through the box to the caller in waiting outside. A simple addition to the contrivance thus far described enables the post-office clerk not only to unlatch the door, but to open it slightly, so that the caller may get his fingers under the sash, and open it from the outside, thus dispensing with a knob or contrivance answering the same purpose on the outside of the sash. This additional contrivance consists of two wedge-shaped plates, H, attached to the inside of the sash-door in such manner that after the latch *t* is disengaged from its hook S the front of the platform will strike against the inclined sides of the wedges, and thus throw the door a little way open. When the front of the platform ascends to and rests in the notch *i* in the wedge-shaped pieces it holds the door open, as shown by the dotted lines in Fig. 1. As soon as the sash-door is thus opened or held open, the person outside can take the letters, or they can be delivered to him through the box by the attendant inside.

I claim as my invention—

1. A pigeon-hole open at one end, so that letters may be deposited in it, and provided at the other end with a glazed door mounted on proper hinges, so that the letters which are in the box may be delivered or taken out of that end to which the door is applied when such door is open, the construction being substantially such as described.

2. In combination with a pigeon-hole open at one end, and provided at the other end with a glazed door mounted upon proper hinges, a latch or fastening contrivance, substantially such as described, whereby the door may be held shut on the inside, thus preventing the renter of the box, or other person, from opening the same and taking out letters until the postmaster from the inside unlatches the door.

3. In combination with a pigeon-hole open at one end, and provided with a sash-door at the other end, as described, the contrivance by which the postmaster can open the door from the inside.

4. In combination with a pigeon-hole open at one end, and closed by a sash-door at the other end, both a latch or fastening contrivance, and a contrivance substantially as described, for partially opening the door from the inside, the combination being substantially such as herein specified.

WILLIAM H. BRAMBLE.

Witnesses:
H. T. EARNEST,
THOS. W. HARDY.